UNITED STATES PATENT OFFICE.

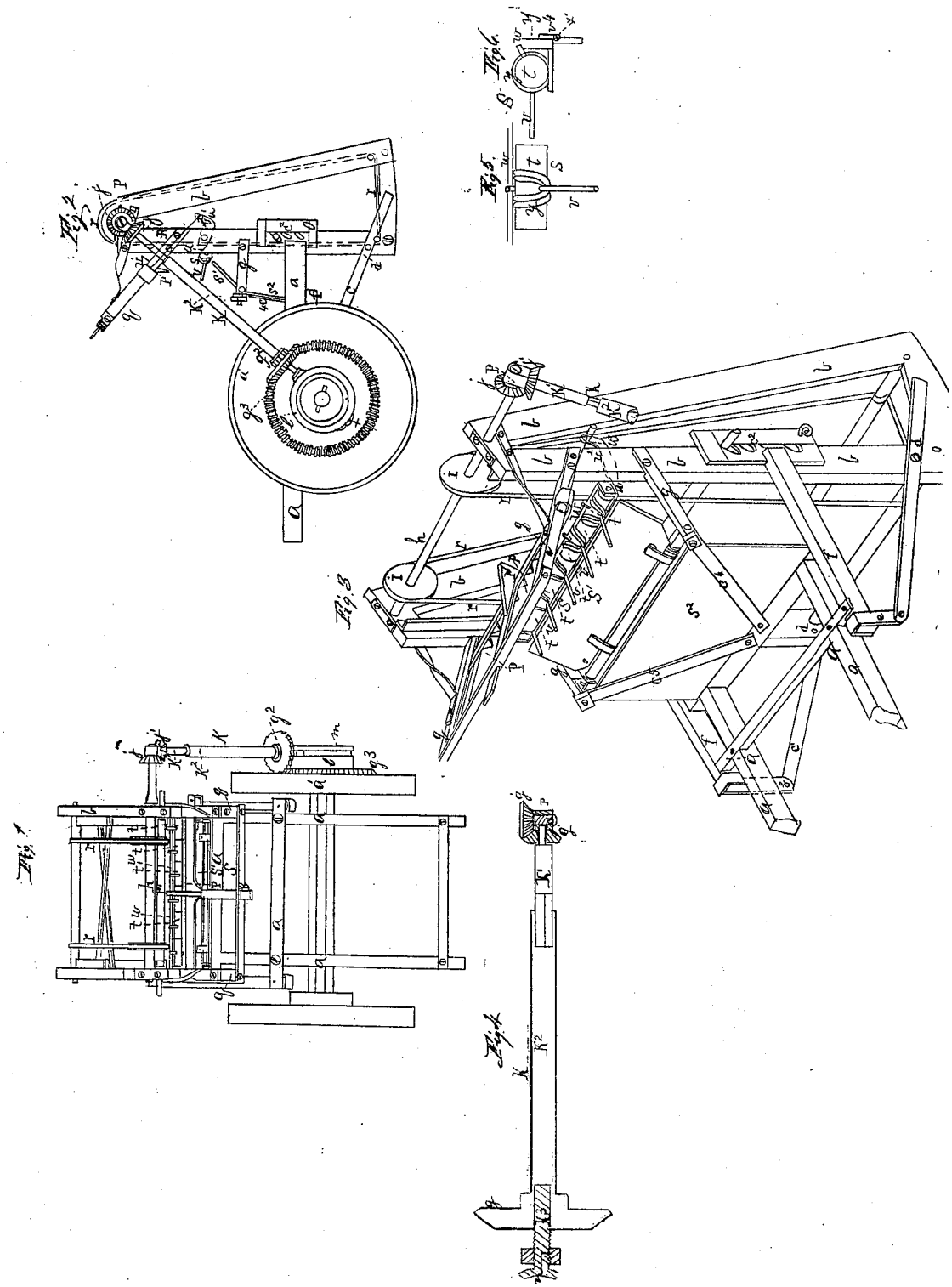
J. Smith,
Hay Loader.
No. 15,046.
Patented June 3, 1856.

JOSEPH SMITH, OF CONDIT, OHIO.

IMPROVEMENT IN MACHINES FOR RAKING AND LOADING HAY.

Specification forming part of Letters Patent No. 15,046, dated June 3, 1856.

*To all whom it may concern:*

Be it known that I, JOSEPH SMITH, of Condit, in the county of Delaware and State of Ohio, have invented a new and useful Improvement in Machines for Raking and Loading Hay; and I do hereby declare that the following is a full, clear, and exact description of the construction and operation of the same, reference being had to the annexed drawings, making part of this specification, in which—

Figure 1 represents a plan view of the machine; Fig. 2, a side elevation; Fig. 3, a detached perspective, showing the principal parts of the machine; Fig. 4, a vertical section of the segmental shaft; Fig. 5, a detached part of the rake, showing the tooth and the manner of forming it; Fig. 6, a side view of Fig. 5.

My invention consists in a certain combination of devices for raking and loading hay, whereby I am enabled to facilitate the operation of gathering and discharging it on the wagon, and at the same time prevent the hay from clogging and from falling off the wagon after it has been carried to the place of discharge, as hereinafter set forth.

To the rear end of the wagon-frame $a$, and secured thereto, is suspended a frame, $b$, for supporting the machinery. This frame $b$ is attached to the wagon-frame $a$ by means of braces $c$ $c'$ $c^2$ $c^3$ $c^4$ $c^5$, which allow the frame $b$ to be adjusted and made suitable to hard or soft ground. The wheels will sometimes bury themselves felly-deep, and consequently the rake-frame will have to be raised to allow a passage for the rakes in their revolution. The braces $c^2$ $c^3$ are secured to the ends of arms $f f$, and serve the purpose of steadying the rake-frame $b$, and also allow it to be raised or lowered for the purposes above set forth. The braces $c^4$ $c^5$ are bolted at one end to the frame $a$, and at the other end held firmly to the end of arms $g$ $g$ by screw-nuts, which are merely for giving additional strength to the machine.

At the upper end of frame $b$ revolves a shaft, $h$, which has keyed to it two belt-wheels, $i$ $i$. One end of this shaft extends out from the frame $a$ a suitable distance, and has on its end a bevel-wheel, $j$, which takes into a similar bevel-wheel, $j'$, on the end of a segmental shaft, $k$. This shaft reaches from bevel-wheel $j'$ to an enlargement extending from driving-wheel $a'$. This enlargement or drum $l$ revolves with the driving-wheel $a'$.

The shaft $k$ is composed of three pieces, as shown in Fig. 4, the wheel $j'$ being keyed to the segment $k'$, which segment is made square at the end, fitting into segment $k^2$, and revolves with it. This segment $k^2$ has keyed to its lower end a bevel pinion-wheel, $j^2$, which takes into the large bevel-wheel $j^3$, secured to and turning with the driving-wheel $a'$. The segment $k^3$ is secured to a band, $m$, which band is hinged at $x$. (Shown in Fig. 2.) This band $m$ encircles the drum $l$, and is secured in an annular slot in said drum and allows the drum $l$ to revolve freely with the driving-wheel. The segment $k^3$ serves to hold in place and at the same time allows the pinion-wheel $j^2$ and shaft $k^2$ to revolve, carrying with it the segment $k'$ and bevel-wheel $j'$, which bevel-wheel has its bearing in loop $p$. The object of constructing this shaft as above described is as follows:

It is evident that in raising and lowering the rake-frame some contrivance must be employed to drive the rakes, and at the same time adaptable to every situation in which the frame may be placed, and with this contrivance it will be at once seen that if the frame is raised the shaft will be extended and the gearing not be displaced.

The pulley-wheels $i$ $i$ revolve and carry with them the bands $r$ $r$, on which are secured the rakes $s$, one of which is shown in the drawings. These rakes are formed by a number of sections, $t$ $t$. Each section carries a tooth, $v$, which extends through its section, and is bent so as to rest on the rake-head $w$. (Shown in Figs. 5 and 6.) Around each tooth and sectional piece is wound a wire, $y$, so as to secure the sections in their proper position for gathering the hay. The ends of the wire are secured to the rake-head. By this arrangement I can construct as cheap a rake and at the same time make it much stronger than when the teeth are formed of a single wire.

The rakes gather the hay at proper intervals and raise it to the point shown in Figs. 2 and 3, where a peculiar-shaped fork gathers it off the rake and deposits it on the wagon. These forks, the teeth of which are V-shaped, extend across the frame, their ends forming rests which slide in grooves in arms $q$ $q$. These arms are firmly secured by braces to the rake-frame $b$.

In the center of the rake-head is a projection, $r'$, for the purposes hereinafter described.

As the rakes rise to the place of discharge the rake-teeth force out a guard-plate, $s'$, secured to arms $g\ g$, and when the rake has passed it this plate springs back under the rake and prevents the loose hay from falling on the ground behind the wagon. Below this spring guard-plate $s'$ is a stationary plate, $s^2$, which keeps the hay on the wagon, and also prevents the hay from getting in the way of the rakes as they pass up. After the rake passes the spring-guard $s'$ it raises one arm of the trip-dog $v^2$. The other arm, $w'$, being connected with the fork, brings it directly over the rake $s$, which, we will suppose, is full of hay. Now, the teeth, being of a V shape, as above described, and at right angles with the rake, gather the hay, and as the rake rises it forces the fork back by means of projecting piece $r'$, so as to drop the hay directly on the wagon, and the next rake draws the fork back for another supply of hay.

I have provided a stay, $v^4$, which supports the rake and prevents the weight of the hay from causing the rake to drop and lose its load. This stay $v^4$ is secured to the rake-head and is hinged at $x'$. The lower part forms a shoulder, as seen in Fig. 6.

Having thus described my improvements in raking and loading hay, what I claim, and desire to secure by Letters Patent, is—

The spring guard-plate $s$, operated by the rake for the purposes herein set forth.

JOSEPH SMITH.

Witnesses:
R. J. CAMPBELL,
JOHN S. HOLLINGSHEAD.